(No Model.) 5 Sheets—Sheet 3.

J. L. HAYWARD & T. C. SIMONTON, Jr.
AUTOMATIC CASH CARRYING DEVICE.

No. 343,455. Patented June 8, 1886.

(No Model.)  5 Sheets—Sheet 4.

J. L. HAYWARD & T. C. SIMONTON, Jr.
AUTOMATIC CASH CARRYING DEVICE.

No. 343,455.  Patented June 8, 1886.

Witnesses:
F. H. Simonton.
F. D. Moore

Inventors:
Jacob L. Hayward
Thomas C. Simonton Jr.

UNITED STATES PATENT OFFICE.

JACOB L. HAYWARD, OF FRAMINGHAM, MASSACHUSETTS, AND THOMAS C. SIMONTON, JR., OF PATERSON, NEW JERSEY.

AUTOMATIC CASH-CARRYING DEVICE.

SPECIFICATION forming part of Letters Patent No. 343,455, dated June 8, 1886.

Application filed November 6, 1885. Serial No. 1­2,000. (No model.)

*To all whom it may concern:*

Be it known that we, JACOB L. HAYWARD and THOMAS C. SIMONTON, Jr., citizens of the United States, residing, respectively, at Framingham, in the county of Middlesex and State of Massachusetts, and at Paterson, in the county of Passaic and State of New Jersey, have invented new and useful Improvements in Automatic Cash-Carrying Systems; and our improvements relate to that class of cash-carrying systems wherein cash balls or boxes are used to carry the cash, and roll or travel upon inclined tracks or ways.

In all the systems in use, so far as we have been able to learn, the balls or boxes are discharged from the tracks or ways to their designated stations by falling through openings in the track or way, or by running upon tilting traps forming part of the track or way, and from the track or way fall into baskets or other receptacles beneath. The former case is objectionable, because uncertain; the latter, because complicated as well as uncertain. Again, in all the systems in use the balls or boxes, as they run or travel on the tracks or ways, make a noise that is very objectionable, and as the balls at the cashier's desk or other central point fall from the track above to the cashier's desk below they make a still greater and more objectionable noise, and the balls also become shattered and broken. Again, in all the systems so far in use, as we learn, but one cash-ball or box can be elevated to and run on the track at once, and that two or more balls cannot immediately follow each other on the return-track without retarding or conflicting with each other, and in many cases altogether preventing some of them going to their destination.

Our improvements consist of, first, the sending and return tracks or ways, and the side or switch tracks therefrom, so constructed that the cash-carriers as they roll or travel over them will make no noise; second, of a series of short spur or side tracks for each of the stations for discharging the balls from the main return-track and side tracks to their respective stations, and for sending the balls back onto the sending or higher track, so that they may run to the cashier, carrying the cash; third, of the avoidance of the use of all openings or holes and traps at the stations and switches; fourth, of means to break the fall of the cash balls or boxes as they are sent to the cashier's desk from the various stations, when they fall from the track above to the desk below; fifth, of a combined elevator and receiver to receive and elevate the carriers from and to the tracks at the various stations; sixth, of an elevator at the cashier's desk, by which a number of carriers may be elevated at one time from the desk to the return-track above; seventh, of a stationary or fixed switch so constructed to switch or turn off from the main to spur or side tracks or ways, and from side tracks onto other side or spur tracks such balls or carriers as are intended to be switched or turned off, or for such spur or side tracks and stations, without interfering with the course of other balls; eighth, of means to prevent the carriers intended for particular stations from falling from the spur or station track when the receiving-receptacle is not in position to receive the carriers; ninth, of means to prevent the elevator from jarring or making a noise; tenth, of a series of cash-balls. We obtain the results by the mechanism illustrated in the annexed drawings, and hereinafter more particularly described, in which—

Fig. 5 is an enlarged plan view of switch. D is the switch-track; D', the turning or guide rods; D², the post for holding the same; D³, set-screws; D⁴, spring; E, the stiffening-rods; A, the track. Fig 6 represents a side elevation of the same. Fig. 7 is a cross section of the track, showing one of the posts. Fig. 8 is an enlarged portion of switch or guide rods D', showing manner of adjusting and holding.

Fig. 9 is the suspension-bands with clamps. $k$ is the band; $l$, the clamps; E, the stiffening-rods.

Fig. 10 shows the manner of fitting the switches in the main track; E, the stiffening-rods; $m$, the bent forms with pins $m'$ to fit.

Fig. 11 is a cross-section of the main and spur and switch tracks or ways composed of netting Z, held in position by stiffening-rods E. Fig. 12 is a cross-section of the end of the station or spur track at the stations, and shows the manner of holding the ball onto the track when the receiving-receptacle is out of position.

Figs. 13 and 14 represent the cash ball or carrier; K is the body of the ball or carrier; K', the cap; $s$, clutch-spring; $s'$, metal disk; $s^2$, thumb-pins; $t$, rubber hemispheres; $t'$, disk; L, circular chamber.

Fig. 15 is a side elevation of the system, showing return-tracks A and sending-track B, stations or spur tracks, elevators C, cashier's desk $x$, elevator F, and receiver there.

The tracks or ways and the side tracks therefrom for sending the balls from the various stations to the cashier's desk or other central point are highest at the farthest station and incline gently downward, say, at about from an eighth to a quarter of an inch in a foot toward the cashier's desk, while the main and side tracks for returning the carriers are highest at the cashier's desk or other common center, and incline gently downward the opposite way from the sending tracks, so that the carriers of their own gravity will roll on the tracks.

Figures 9, 10, 11, 12, 13, 14, 15:
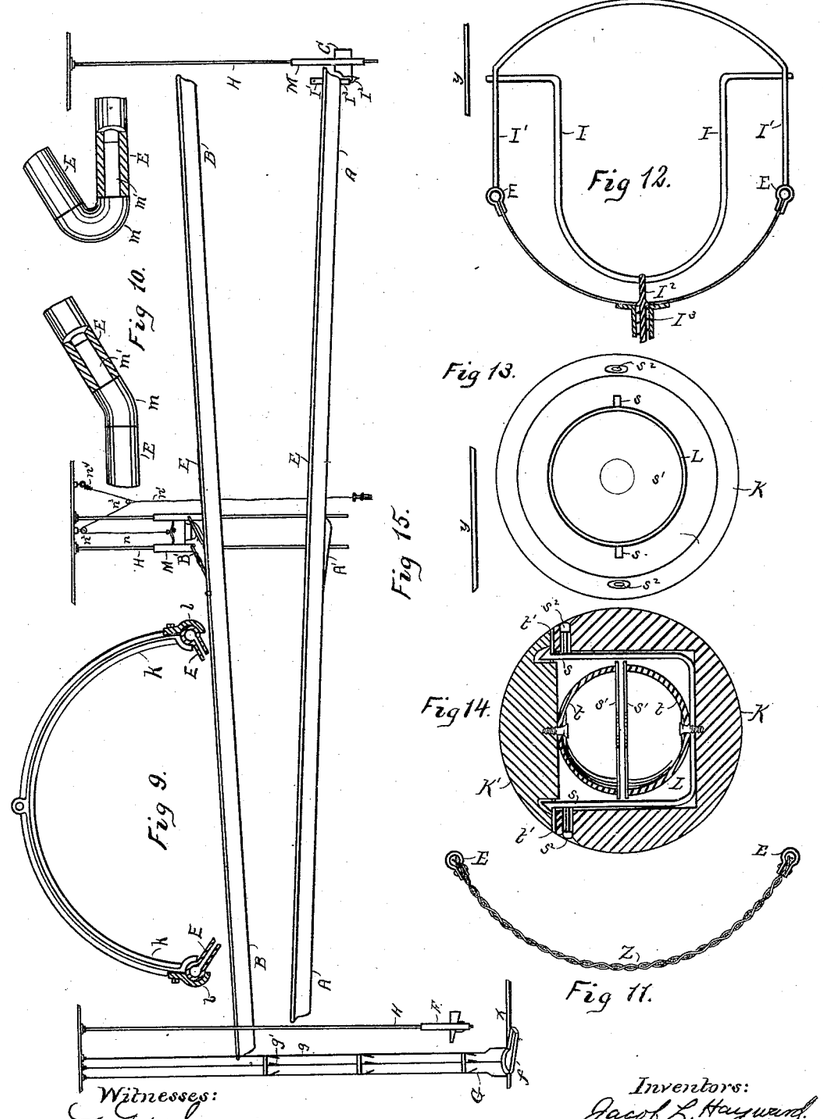

For tracks or ways for the carriers to travel or run upon we make use of netting to form a gutter or gulley and held in position and shape by the use of two parallel rods, as shown in Fig. 11, which shows a cross section of the track, Z representing the gutter or gulley made of netting. E are the parallel stiffening-rods. We prefer that the netting be made of wire and the rods of metal, but do not confine ourselves to any particular material.

We make the spur or side as well as all the main tracks of the netting Z and rods E, and we have found from use that tracks so constructed avoid all noise as the cash-carriers roll over them, besides making cheap, durable, as well as ornamental tracks or ways. The tracks are very easily made. The netting may be cut in lengths and of the proper size and width, and the rods then fastened or clamped onto the edges of the netting, and the netting then bent over a form so as to make a slight gulley or segment of a circle, and of a width between the parallel rods E to hold the largest-sized ball. The spur, side, and station tracks are made in the same manner.

Figures 1, 2, 3, 4:
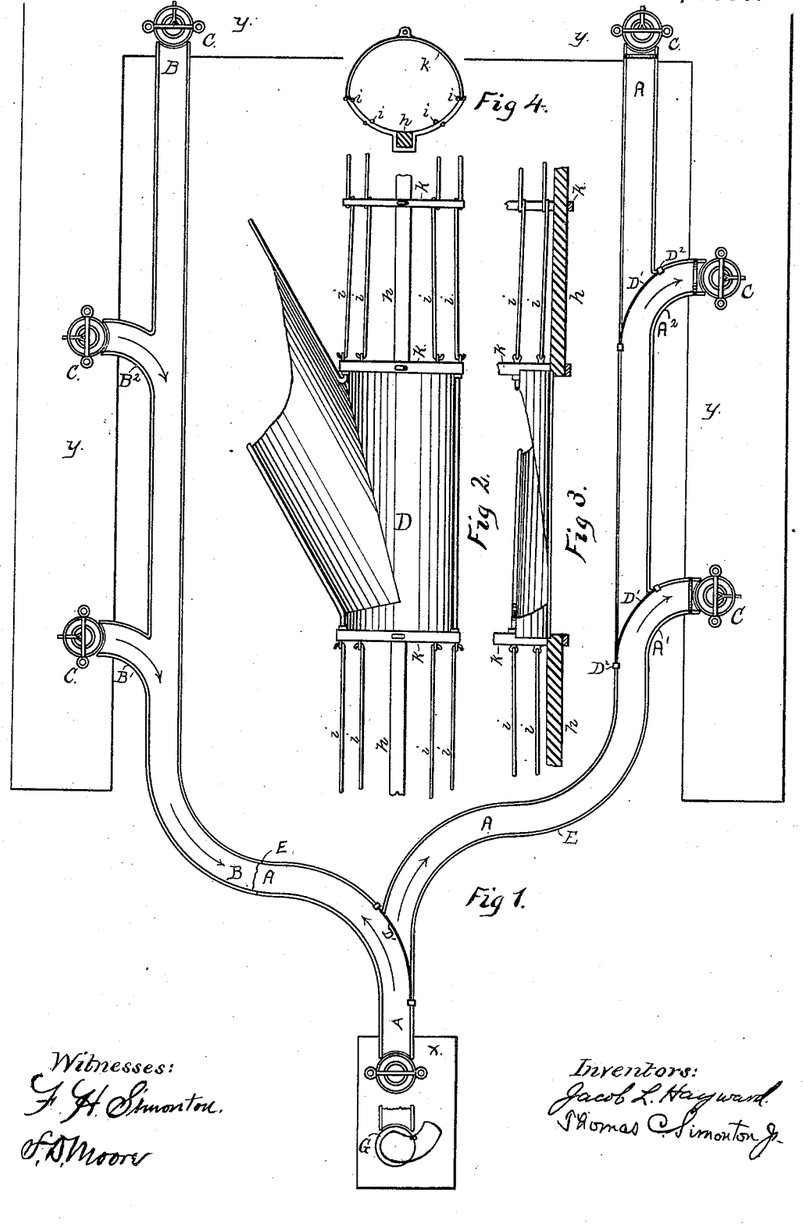
Figure 1 is a plan view of the sending and return tracks, and spur or station tracks, elevators, counters, and cashier's desk. A is the return, B the sending tracks; C, the elevator at the different stations; F, the elevator at the cashier's desk $x$; G, the receiver at the cashier's desk; A' and A², the station branches or spurs to the stations; B' and B², the branches from the stations to the main track. $y\ y$ are the counters.
Fig. 2 is a plan view of a short section of a single track with switch introduced, D being the switch; $h$, the single rail or track; $i\ i$, the guide-wires; $k$, the forms for holding the rail $h$ and wires $i\ i$.
Fig. 3 is a vertical section of the same.
Fig. 4 is a cross-section thereof.

The stations are formed by the insertion of short spur-tracks into the main tracks, as shown in Fig. 1, A' and A² being stations or spur-tracks from the return-track A, to receive the carriers returned by the cashier from $x$, and B' B² being station-tracks to send the balls back onto sending-tracks B, so that they may go the cashier's desk at $x$.

Figures 22, 23, 24, 25, 26, 27:
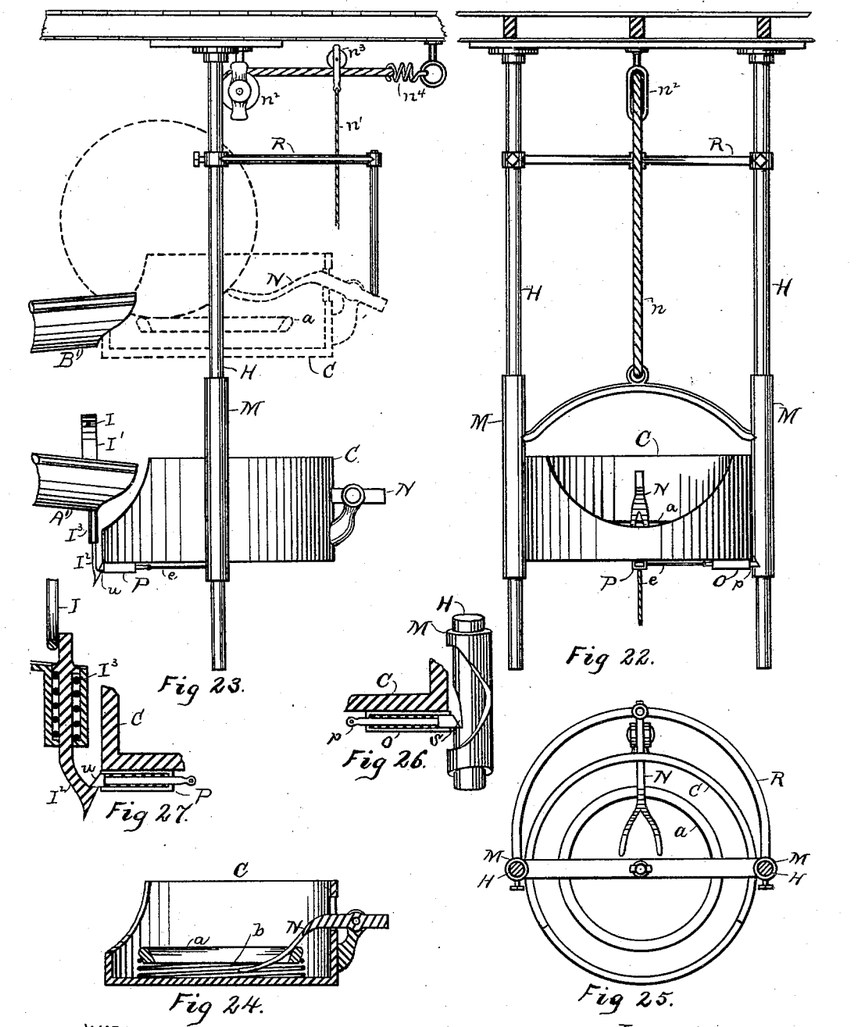
Fig. 22 is a front view of the combined elevator and receiver to be used at the various stations for raising and lowering the cash balls or carriers to and from the tracks or ways. C is the elevator box or basket; H, the rods; M, the sliding guides; N, lever for discharging the ball; O, spring for holding the elevator; P, spring for stopping the ball; R, adjustable stop; $n$, main cord; $n'$, cord for elevating; $n^2$, pulley; $n^4$, spring; $a$, ring; $b$, spring.
Fig. 23 is a side elevation of the combined receiver and elevator at one of the stations, and shows the elevator in position to receive the ball returned from the cashier's desk, while the dotted lines above represent the elevator in position and in the act of discharging the cash-ball onto the spur-track, so that it may go thence to the cashier.
Fig. 24 is a section through the elevator box or basket.
Fig. 25 is a plan view of the combined elevator and receiver.
Figs. 26 and 27 are enlarged views of the spring-catches.

Fig. 23 represents a station. The upper track, B', is station-track for returning the cash-carriers back onto the return-track, and the lower track, A', is the station or spur track which the balls for that particular station are switched on from off the main track. Fig. 23 also represents a station at the end of both the main tracks as the last stations shown in Fig. 1.

We avoid the use of holes and tilting traps and like devices heretofore employed to switch or turn off the cash-carriers from one track to another or to compel them to fall through the main or side tracks at the stations into receptacles below, and to this end we make use of a switch. (Shown in Figs. 5 and 6.)

Figures 5, 6, 7, 8:
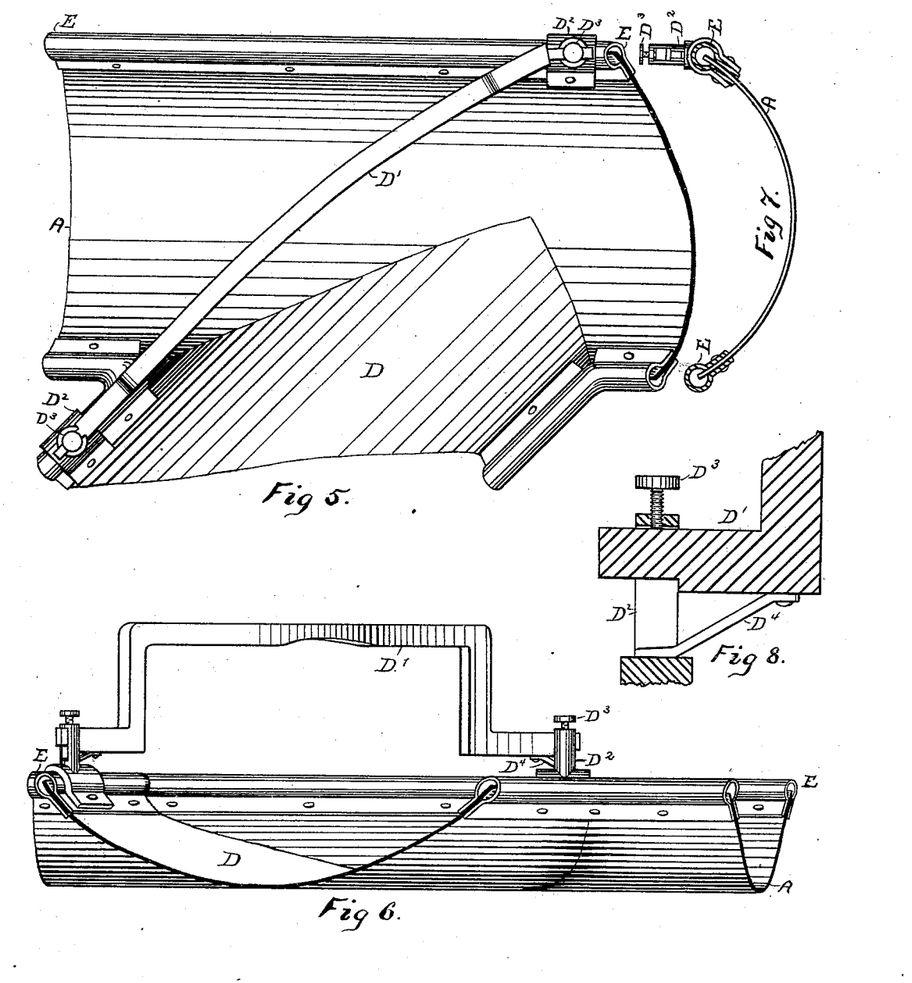

Fig. 5 is a plan view of the switch. A represents the main track; D, the side or switch track. D' is a turning or guide rod fitting into posts D², held in position by the set-screw D³ and spring D⁴. E are the stiffening-rods. Fig. 6 is a side elevation of the same. The turning-rod D' extends from the outside rod of the main track A, diagonally over the same to the rod on the farthest side of the spur-track. The switches need only be used on the track for returning the balls from the cashier's desk to the various salesmen and stations. By the use of these switches as many cash-balls as is desired may be placed on the return-track at one time by the cashier. The balls for the various stations should be of different diameters—say one-quarter of an inch larger than the next smallest. The switches should be set by means of the set-screw D³ and spring D⁴ at different heights above the track A. Those nearest the cashier's desk $x$, Fig. 1, should be set at just such a height that all the cash-balls, (which latter should be of graduated diameter, say, about one-quarter of an inch difference in the balls for the various stations,) except the largest sized diameters, will run on the track and under the turning-rod D′, while the balls too large to pass under the rod D′ strike the rod and will be guided by their momentum onto another main track or onto side or station tracks. For instance, the cashier at $x$, Fig. 1, places on the return-track A a number of balls of various diameters. This track, as is shown, turns to the right and left, a part only of that on the left being shown, while on the right it is shown with the various station-tracks extending from it. The balls so placed on the track A run along it until the first switch or turning rod, D′, is encountered, when all the balls intended to go to the right, and being the balls of the smaller diameters, pass on under the rod, while those balls intended to go to the left, and being of larger diameters, strike against the rod D′ and are turned, and compelled to turn in their course, and are guided to the left and pass onto the various stations as those which went to the right do. Those balls that pass under the first turning-rod D′ and go to the right run along until the turning-rod D′ is encountered at A′. The smaller balls still continue on along the main track A, while the larger ones and those intended for this station are prevented from passing, and are guided and turned off from the main track A by the rod D′ onto the station-track A′, from which it is taken, as hereinafter shown. The larger of the balls that passed on under the rod D′ at station A′ are turned off and guided from the main track A onto the station-track A² by the switch or turning rod D′ at that station, and in this manner the graduated balls at any and all stations are turned off from the main track onto the station-tracks or onto side tracks, by simply setting the switch or turning rod D′ at various heights, (corresponding to the diameters on the balls,) so as to guide the balls from the main onto the side and station tracks. The balls for nearest side switches or nearest stations to the cashier must be the largest, and the turning-rod D′ there set the highest, the balls for the next station or side track must be the next largest and the turning-rod D′ set the next highest, and, so on, all are gradually diminished.

The switch which we show in Figs. 5 and 6 is a complete switch for all the stations and side tracks which may be used in connection with any kind of a track or way consisting of one, two, or more rails, or of gutters, gullies, troughs, or half-tubes.

In Fig. 2 we show a plan view of a short section of a single-rail track with the switch introduced, $h$ being the rail, $i\,i$ the guide-rods, and D the switch.

The switch we show in Figs. 5 and 6 is composed of the main track A, the parallel rods E E, for stiffening and holding the gutter or gully in position, and the gutter or gully of the switch track D, the turning or guide rod D′, held in position by the posts D², screws D³, springs D⁴.

Wherever in the main tracks A and B it is desired to form a switch, all that is necessary to do is to cut out a portion of the stiffening-rod on the side of the track the switch is to be inserted and placing the bent forms $m$, Fig. 10, into the rod E of the main track and the rods E of the side switch or station track, and so much of the gutter or gully of the main track A is cut away as to allow of switch-track D to be introduced, as shown in Fig. 5. When the tracks are made of one or more rails, then the complete switch, as shown in Figs. 5 and 6, is introduced, as shown in Figs. 2 and 3.

The balls when they are switched from the main to the various station-tracks are prevented from falling from the track, when the receiver is not in position to receive the balls, by the use of the swinging bar I, Figs. 12, 23, and 27, suspended from stationary support I′. This bar I is suspended back of pin I². Pin I², when the receiving-receptacle is out of position, is always caused to project by means of the spring I³ up through the station-track A′, in front of the swinging bar I, and being so held by the pin I² the balls are held back and cannot roll off until the pin I² is lowered and the swinging bar allowed to swing, as hereinafter described.

The balls are received from and elevated to the tracks at the salesman's station by means of the combined receiver and elevator shown in Figs. 22 and 23. C is the box or basket. H are the rods, shown suspended from the ceiling. These rods should be stationary. M M are the sliding telescope guides. To these two guide-rods the box or basket C, for receiving and holding the carriers, is fastened, and the guide-rods H and basket C are suspended by means of cord $n$, passing over pulley $n^2$, the end of which is fastened to spring $n^4$. The cord $n$ is of sufficient length to allow the elevator to drop low enough to admit of the balls being easily removed by the salesmen. The use of the spring $n^4$ is to prevent the elevator from jarring when it reaches its lowest point in descending. The elevator is raised by means of cord $n'$ and pulley $n^3$.

The elevator is shown in Fig. 23 in position for receiving a ball from station-track A', and is held in place by means of spring-catch O p, fitting into a slot, S, in rod H, as shown in detail, Fig. 26. When the elevator is in position for receiving the ball, the spring-catch u P engages into pin I² and pulls it down and allows the swinging bar I to swing, and the ball rolls out of the station-track A' into the box or basket C of the elevator. String e, fastened to spring-catch O p, and also to spring-catch u P, is then pulled by the salesman and the catch is released from slot S and catch u from pin I², and the basket C, with the cash-ball, descends, so that the salesman may remove the ball.

When the elevator is to be raised, and the ball sent to the cashier's desk, the salesman places the ball containing the cash into the basket or box C, when it is raised by the cord n' until it reaches the position shown by the dotted lines in Fig. 23. The end of bent lever N, coming in contact with adjustable stop R, raises and throws forward the ball out of basket or box C onto the station-track B', and the ball rolls from thence onto the main track B, and thence to the cashier's desk. The elevator, after having discharged the ball, is allowed to descend of its own gravity until the slot S is reached, when the spring-catch O p immediately engages into it and holds the basket C in place ready to receive a cash-ball from the station-track A'. During the time the elevator is out of position to receive the balls from station-track A', the weight being taken from off pin I², the spring I³ forces the pin I² up through the track A', and it holds the swinging bar I in position to prevent the balls from falling from the track A', as already described.

At the cashier's desk, or other central point, at which all the cash balls or carriers are sent with the cash, the receiver G is placed, through which the balls fall from the return-track B, above, to the cashier's desk x, below, Figs. 15 and 16, and the force of the fall is broken by means of arms g' and springs g², Figs. 16, 18, and 19.

Figures 16, 17, 18, 19, 20, 21:
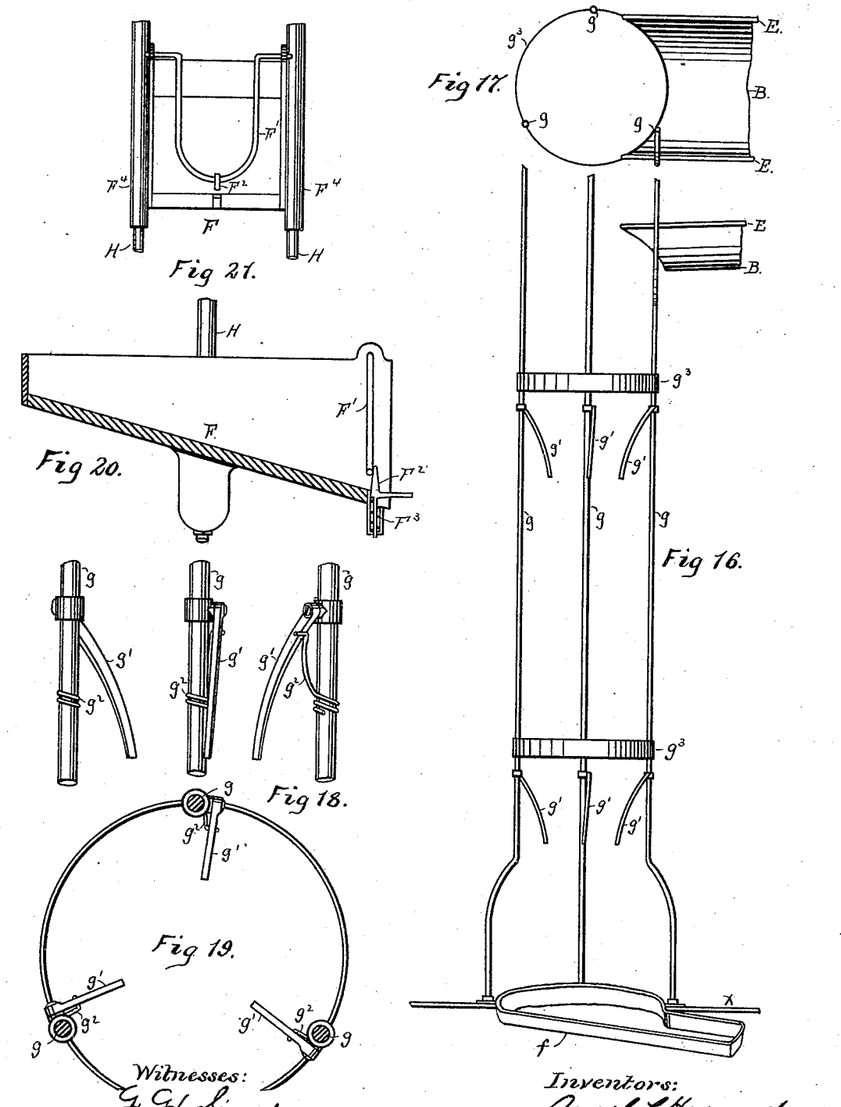
Fig. 16 represents in elevation the receiving-receptacle at the cashier's desk or other central point, in and through which the balls fall from the track above to the cashier's desk below. B is the track; $x$, the desk; $f$, the basket or receptacle into which the balls fall. $g$ are rods; $g'$, checking-arms; $g^2$, springs; $g^3$, band.
Fig. 17 is a plan view of last figure.
Fig. 18 is an enlarged view of a section of the same, showing manner of holding the check-arms.
Fig. 19 is a plan view of last figure.
Fig. 20 is a cross-section of an elevator for more than one ball, and designed, principally, to be used at the cashier's desk. F is the elevator-box with inclined bottom; F', the stop; F², the stop-pin; F³, the spring; F⁴, sliding guides, and H the rods.

Fig. 16 represents the receiver, extending from track B, above, to cashier's desk x, below. The balls falling from the return-track B through the receiver, between the upright rods g, come in contact with the arms g', held toward the center by means of springs g². The weight of the ball or balls opens the arms g', and allows the ball or balls to fall to the next set of arms g' below. Those open, as before, and the ball or balls fall into the basket f on the cashier's desk x. This receiver may consist of any number of rods g and as many sets of arms g' with springs g² as are necessary to break the fall of the balls, and according to the height from which the balls fall. The rods g should be fastened to the cashier's desk below and to the ceiling or other proper place above, so as to keep them stiff, and the rods should be held together between the desk and ceiling by bands, such as g³. The arms g' and springs g² are so constructed as to allow balls of different diameters to pass through without any perceptible increase of friction. As the opening formed by the arms is enlarged by balls of the largest diameters, the ends of the springs g² in contact with the arms g' are raised toward the pivot-points, thus reducing the leverage, consequently the tension of the spring. There may be inserted, instead of the arms g' and springs g², bumpers of rubber or some other elastic material, so as to break the fall of the balls, and also to avoid any and all noise by reason of the balls falling from the track to the desk. The upper surface of arms g' may be covered with some soft material, so as to deaden all sound when the balls fall upon them.

At the cashier's desk we show an elevator of sufficient capacity to raise two or more balls at the same time from the desk x to the return-track A.

In Fig. 20 we show a cross-section of the elevator with an inclined bottom, F. The balls are held in the elevator-box by means of swinging bar F', pin F², and spring F³, of which a front view is shown in Fig. 21. The elevator-box is with telescope guide-rods F⁴, moving on rods H, as shown in the description of the combined elevator above. When the elevator is raised to the return-track A, the pin F² is depressed, releasing the swinging rod F' and allowing the balls to fall out of the elevator-box onto the track, and from thence they run to their respective stations, as heretofore described.

For cash-carriers we make use of balls made of wood, rubber, or other proper material having a cavity within, in which the cash is placed. The balls should be of different diameters. All the balls for one station should be of one diameter, and the balls intended for different stations should be graduated, so that they will differ for each station about one-quarter of an inch in diameter. The largest balls are intended to be switched first, the next largest second, and so on.

We do not confine ourselves to any particular design of cash-balls, as balls of any pattern may be used. We show a cash-ball in the accompanying drawings, Figs. 13 and 14. The ball consists of body K and cap K'. Within the body of K is a circular chamber, L, of sufficient size to admit of the largest piece of money. Within this chamber L is placed a narrow spring, s, extending across the bottom and up the two sides, and ending in clutches having inclined faces, and of sufficient length to engage into the face of plate t', attached to the under side of the cap K'. Attached to the bottom of chamber L and cap K' are hemispheres t, of rubber or other elastic material, having upon their upper faces circular disks s' s', for the purpose of holding the cash. On the two opposite sides of the spring are buttons extending through the body of K. The cap K' has a metal ring attached to its face.

The body of the cap is recessed to allow the ends of the spring s to enter and engage in the edge of metal ring or rim t'.

The operation is as follows: When it is desired to open the ball, it is held in the most natural manner, and with the thumb and finger the two buttons $s^2$ are pressed, forcing the spring toward the center and pressing the catches from the ring. The cap is removed, the cash is introduced into the chamber, falling upon the disk s'. The cap K' is pressed downward, and the catches engage into the rim, as shown. The elastic spheres are compressed and hold the cash between the two disks s'. The elastic spheres and rim are held in position by screws, as shown. There should be a series of these balls of graduated diameters. All the balls for any one station or switch must be of the same diameter. The balls for the first switch or station are to be those of the largest diameter. Those for the next station or switch must be of the next largest size, and so all are graduated. We suspend the tracks from the ceiling of the store or other place by means of wires attached to the ceiling and fastened to the suspension rods or bands, as shown in Fig. 9, letter k. These bands should be attached to the tracks at short distances apart—say six feet—and when the tracks are one above the other, as shown in Fig. 15, (and in most cases they may be so placed, the sending-track B being above and the return-track A below,) the return-track can be so suspended from the sending-track A.

The manner of working cash-carrier systems are too well known to be fully explained here, and we have above set forth the main features and manner of operating our improvements.

What we claim as new, and desire to secure by Letters Patent, is—

1. In a cash-carrying system, the combination of tracks or ways consisting of longitudinal gutters or gulleys made of netting Z, held in position by rods E, and of switches D and turning-rods D', substantially as and for the purposes hereinbefore set forth.

2. In a cash-carrying system, the combination of the tracks or ways and switches and side and station tracks, in combination with a series of cash-balls of graduated diameters, substantially as and for the purposes herein above set forth.

3. The combination of the return-tracks A with graduated switching-rods D' and spur and station tracks A' A², substantially as and for the purposes set forth.

4. The combination of sending and return tracks therefrom with a combined receiver and elevator at each of the stations, substantially as and for the purposes above set forth.

5. The switch consisting of gulleys A and D, parallel rods E, and turning-bar D', substantially as and for the purposes hereinbefore set forth.

6. The combined receiver and elevator with the tracks or ways and the station-tracks therefrom, substantially as and for the purposes hereinabove set forth.

7. In a cash-carrying system, the combination of the tracks and a series of cash-balls with a general receiver at the cashier's desk, provided with means to break the fall of the balls and deaden the sound thereof as they fall from the track above to the desk below, substantially as and for the purpose hereinabove set forth.

8. A series of cash-balls consisting of the combination of body K, provided with spring s, hemisphere t, and plate s', and thumb-springs $s^2$, with cap K', rim t', hemisphere s, and plate s', substantially as and for the purposes hereinabove set forth.

9. The combined receiver and elevator, consisting of upright rods H H, provided with slot S and bar R, with telescope-rods M, with basket C attached, provided with lever N, and spring-catches u P and O p, and cords n and n', and pulleys $n^2$ and $n^3$, and spring $n^4$, for raising and lowering the same and to avoid jarring, substantially as and for the purposes above set forth.

10. In a cash-carrying system, the station-tracks provided with a swinging bar or rod to prevent the cash-balls from falling off the track when the receiver is not in position to receive them and to allow the cash-balls to pass from the track into the receiver when it is in position to receive the balls, in combination with a receiver at each station, substantially as and for the purposes hereinabove set forth.

11. The combination of a receiver at the cashier's desk, consisting of rods g, arms g', springs $g^2$, and bands $g^3$, in combination with the return-tracks B and a series of cash-balls, substantially as and for the purpose hereinbefore set forth.

12. The elevator-box, with inclined bottom F, swinging bar F', pin $F^2$, and spring $F^3$, said box attached to telescope-rods $F^4$ and guide-rods H, substantially as and for the purpose hereinabove set forth.

13. The combination of station-tracks A' A², provided with bar I, band I', pin $I^2$, and spring $I^3$, with the elevator-box C, provided with catch u and spring P, substantially as and for the purpose hereinabove set forth.

14. In a cash-carrying system, the spring $n^4$, to prevent the elevator from jarring, substantially as and for the purpose above set forth.

15. The series of graduated switches, consisting of tracks A and D, turning-rods D', posts $D^2$, screw $D^3$, spring $D^4$ with the tracks or ways and spur-tracks, and a series of cash-balls of graduated diameters, substantially as and for the purpose hereinabove set forth.

16. The combination of tracks A B and station-tracks A' A² and B' B², in combination with elevators C and F and receiver G, basket f, desk x, and turning-rods D', substantially as and for the purposes above set forth.

17. The combination of tracks or ways composed of netting Z and parallel bars E, with spur and station tracks of the same material, and cash-balls for carriers, substantially as and for the purpose hereinabove set forth.

18. Suspension-bands $k$, provided with clamps $l$, in combination with parallel rods E and tracks A B, substantially as and for the purpose set forth.

19. The combination of parallel bars E, tracks A B, bent forms $m$, and pins $m'$, and switches D, substantially as and for the purpose above set forth.

20. Cash-balls of graduated diameters, in combination with tracks A B and side and station tracks therefrom with graduated switching-rods $D'$ at each of the switches and spur-tracks from the return-tracks, substantially as and for the purposes set forth.

JACOB L. HAYWARD.
THOMAS C. SIMONTON, JR.

Witnesses:
F. H. SIMONTON,
S. D. MOORE.